US012641167B2

(12) United States Patent
Han et al.

(10) Patent No.: US 12,641,167 B2
(45) Date of Patent: May 26, 2026

(54) DISPLAY DEVICE INCLUDING FLEXIBLE SCREEN SUPPORT ELEMENT

(71) Applicant: WUHAN CHINA STAR OPTOELECTRONICS SEMICONDUCTOR DISPLAY TECHNOLOGY CO., LTD., Wuhan (CN)

(72) Inventors: Wen Han, Wuhan (CN); Haize Zhang, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 374 days.

(21) Appl. No.: 18/360,810

(22) Filed: Jul. 28, 2023

(65) Prior Publication Data

US 2024/0007555 A1      Jan. 4, 2024

Related U.S. Application Data

(63) Continuation of application No. PCT/CN2023/095166, filed on May 19, 2023.

(30) Foreign Application Priority Data

Jul. 1, 2022      (CN) ........................ 202210774879.X

(51) Int. Cl.
    *H04M 1/00*      (2006.01)
    *H04M 1/02*      (2006.01)
(52) U.S. Cl.
    CPC ....... *H04M 1/0237* (2013.01); *H04M 1/0268* (2013.01)

(58) Field of Classification Search
    CPC ............. H04M 1/0237; H04M 1/0268; H04M 1/0264; G09F 9/301
    See application file for complete search history.

(56) References Cited

U.S. PATENT DOCUMENTS

| | | | | |
|---|---|---|---|---|
| 10,754,386 B2 * | 8/2020 | Lee | ........................ | G06F 1/1624 |
| 11,079,797 B1 * | 8/2021 | Remez | .................. | G06F 1/1686 |

(Continued)

FOREIGN PATENT DOCUMENTS

| | | |
|---|---|---|
| CN | 108924296 A | 11/2018 |
| CN | 110286807 A | 9/2019 |

(Continued)

OTHER PUBLICATIONS

Chinese Office Action issued in corresponding Chinese Patent Application No. 202210774879.X dated Apr. 20, 2023, pp. 1-9.

(Continued)

*Primary Examiner* — Rockshana D Chowdhury
(74) *Attorney, Agent, or Firm* — PV IP PC; Peter Stecher; Wei Te Chung

(57) ABSTRACT

A display device is provided. The display device includes a shell defined with a display window and including a first end and a second end; a flexible screen disposed on the shell and including a light-transmitting area adjacent to the first end; an optical assembly disposed on the shell; a movement assembly connected to the flexible screen so as to slide the flexible screen relative to the display window. The light-transmitting area is located outside the display window in a first state and located in the display window and facing the optical assembly in a second state.

20 Claims, 4 Drawing Sheets

(56)                    References Cited

U.S. PATENT DOCUMENTS

| 11,832,406 | B2 * | 11/2023 | Kim | G06F 1/1652 |
|---|---|---|---|---|
| 11,849,060 | B2 * | 12/2023 | Zhang | H04M 1/0268 |
| 12,111,703 | B2 * | 10/2024 | Hu | G06F 1/1637 |
| 12,181,917 | B2 * | 12/2024 | Shin | G06F 1/1624 |
| 2018/0138261 | A1 | 5/2018 | Lee | |
| 2019/0317550 | A1 * | 10/2019 | Kim | H04N 23/54 |
| 2020/0022268 | A1 * | 1/2020 | Zuo | G06F 1/1647 |
| 2020/0209924 | A1 * | 7/2020 | Zuo | H04M 1/0237 |
| 2021/0240294 | A1 * | 8/2021 | Ko | G06F 3/0416 |
| 2022/0238047 | A1 * | 7/2022 | Shin | H04M 1/0268 |
| 2022/0322550 | A1 * | 10/2022 | Yin | H05K 5/0217 |

FOREIGN PATENT DOCUMENTS

| CN | 110677519 | A | 1/2020 |
|---|---|---|---|
| CN | 210093271 | U | 2/2020 |
| CN | 112991955 | A | 6/2021 |
| CN | 113014702 | A | 6/2021 |
| CN | 113066368 | A | 7/2021 |
| CN | 113079229 | A | 7/2021 |
| CN | 113454567 | A | 9/2021 |
| CN | 113674642 | A | 11/2021 |
| CN | 113783981 | A | 12/2021 |
| CN | 114203034 | A | 3/2022 |
| CN | 115132083 | A | 9/2022 |

OTHER PUBLICATIONS

Chinese Office Action issued in corresponding Chinese Patent Application No. 202210774879.X dated Oct. 14, 2023, pp. 1-9.
International Search Report in International application No. PCT/CN2023/095166,mailed on Nov. 20, 2023.
Written Opinion of the International Search Authority in International application No. PCT/CN2023/095166,mailed on Nov. 20, 2023.

* cited by examiner

DISPLAY DEVICE INCLUDING FLEXIBLE SCREEN SUPPORT ELEMENT

CROSS-REFERENCE TO RELATED APPLICATIONS

This application is a continuation of International Application No. PCT/CN2023/095166, filed on May 19, 2023, which claims priority to Chinese Patent Application No. 202210774879.X, filed on Jul. 1, 2022. The disclosures of the aforementioned applications are incorporated herein by reference in their entirety.

TECHNICAL FIELD

The present disclosure relates to the field of display, and in particular, to a display device.

BACKGROUND

At present, with the increasing use frequency of various display devices, especially mobile phones, the requirements for a display screen become higher and higher. One of development trends of the display screen is directed to a full-screen. However, some functional components, such as an optical assembly, for example a front camera of the mobile phone, will occupy a part of the display screen, resulting in the inability to display or poor display quality in the occupied area of the display screen. Therefore, it is difficult to improve the display quality of the display device with the full-screen.

Therefore, there is a demand for a display device to solve the above technical problem.

SUMMARY

An embodiment of the present disclosure provides a display device, which can alleviate a technical problem that it is difficult to improve the display quality of a current display device with a full-screen.

An embodiment of the present disclosure provides a display device including:

a shell formed with a display window, and including a first end and a second end disposed on opposite sides of the display window;

a flexible screen disposed on the shell and including a light-transmitting area close to the first end of the shell;

an optical assembly disposed on the shell and on a side of the flexible screen away from the display window; and a movement assembly disposed on the shell and connected to the flexible screen;

wherein the movement assembly is configured to slide the flexible screen relative to the display window so that the display device is switched at least between a first state and a second state;

in the first state, the light-transmitting area is located outside the display window; and in the second state, the light-transmitting area is located within the display window and faces the optical assembly.

DETAILED DESCRIPTION OF EMBODIMENTS

Figure 1:
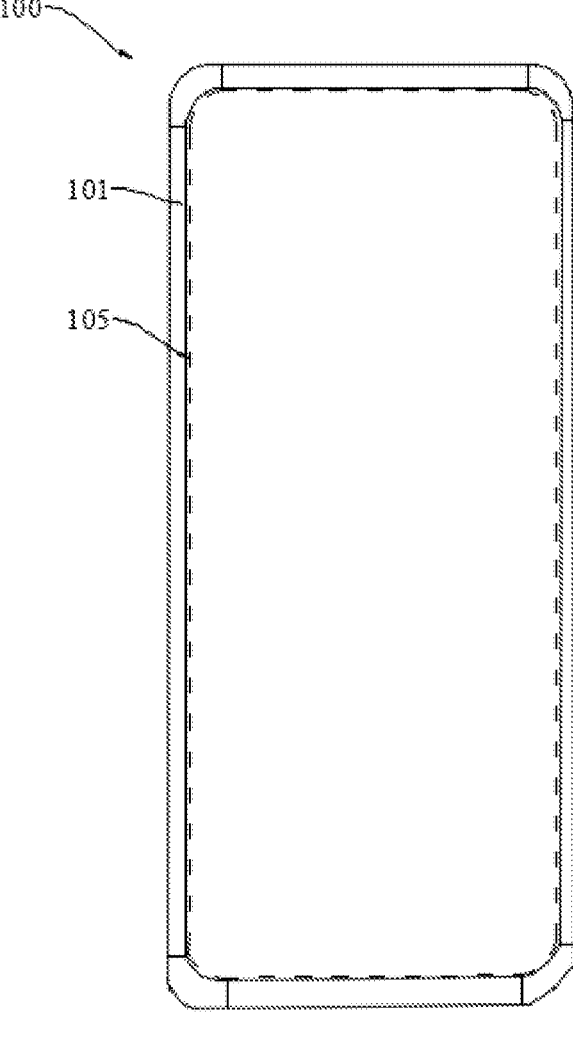
FIG. 1 is a schematic diagram of a first structure of a display device according to an embodiment of the present disclosure.

Embodiments of the present disclosure provide a display panel, in order to make the objective, technical solutions and effects of the present disclosure clear and explicit. The present disclosure will be described in further detail below with reference to accompanying drawings and embodiments. It is to be understood that the specific embodiments described herein are merely illustrative, and are not intended to limit the present disclosure.

At present, the arrangement of functional components, such as an optical assembly, for example a front camera of a mobile phone, will occupy a part of the display screen, resulting in the inability to display or poor display quality in the occupied area of the display screen. Therefore, it is difficult to improve the display quality of a display device with a full-screen.

Referring to FIGS. 1-7, an embodiment of the present disclosure provides a display device 100 including the following structures.

A display window AA is formed on a shell 101. The shell 101 includes a first end 106 and a second end 107, which are on opposite sides of the display window AA.

A flexible screen 102 is disposed on the shell 101. The flexible screen 102 includes a light-transmitting area 103 close to the first end 106.

An optical assembly 108 is disposed on the shell 101. The optical assembly 108 is arranged on a side of the flexible screen 102 away from the display window AA.

A movement assembly 109 is disposed on the shell 101. The movement assembly 109 is connected to the flexible screen 102.

The movement assembly 109 is configured to slide the flexible screen 102 relative to the display window AA, so that the display device 100 is switched at least between a first state and a second state.

In the first state, the light-transmitting area 103 is located outside the display window AA.

In the second state, the light-transmitting area 103 is located within the display window AA, and faces the optical assembly 108.

According to the embodiment of the present disclosure, the flexible screen is driven to slide relative to the display window by the movement component, so that in the first state, the display device is in a full-screen display state, and the light-transmitting area is located outside the display window, thereby improving the display quality of the display device in the full-screen display state.

The present disclosure will now be described in conjunction with specific embodiments.

Referring to FIGS. 1-7, in an embodiment, the display device 100 includes a shell 101, a flexible screen 102, an optical assembly 108, and a movement assembly 109. A display window AA is formed on the shell 101. The shell 101 includes a first end 106 and a second end 107, which are formed on opposite sides of the display window AA. The flexible screen 102 is disposed on the shell 101. The flexible screen 102 includes a light-transmitting area 103 close to the first end 106, a first display area 104 surrounding the light-transmitting area 103, and a second display area 105 on a side of the first display area 104 away from the first end 106. The optical assembly 108 is disposed on the shell 101. The optical assembly 108 is on a side of the flexible screen 102 away from the display window AA. The movement assembly 109 is disposed on the shell 101 and connected to the flexible screen 102. The movement assembly 109 is configured to slide the flexible screen 102 relative to the display window AA so that the display device 100 is switched between at least a first state and a second state. In the first state, the second display area 105 faces the display window AA, and the light-transmitting area 103 is located outside the display window AA. In the second state, the light-transmitting area 103 is located within the display window AA and faces the optical assembly 108.

Referring to FIG. 1, when the display device 100 is in the first state, the display device 100 is in a full-screen display state, and the second display area 105 faces the display window AA. That is, an orthographic projection of the second display area 105 on the shell 101 is located within the display window AA. The light-transmitting area 103 and the first display area 104 are outside the display window AA. In this case, the full-screen display of the display device 100 in the first state is not influenced by the light-transmitting area 103, thereby improving the display quality of the display device 100 in the full-screen display state. When the display device 100 is in the first state, the first display area 104 is located outside the display window AA. In this case, when images are to be displayed by the display device 100, the flexible screen 102 in the second display area 105 serves to display these images, and the flexible screen 102 in the first display area 104 may not perform images display.

Figure 2:
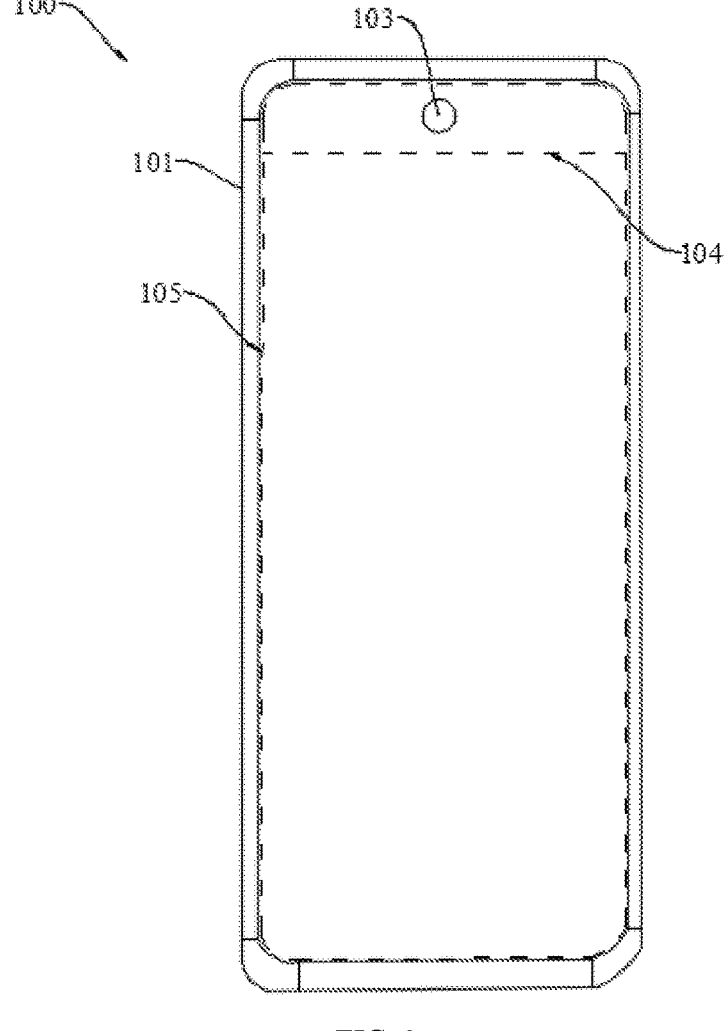
FIG. 2 is a schematic diagram of a second structure of a display device according to an embodiment of the present disclosure.
Figure 3:
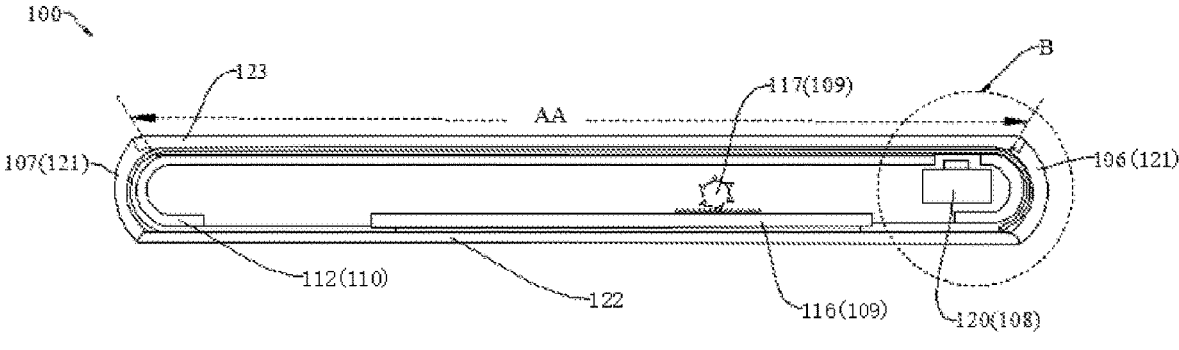
FIG. 3 is a schematic diagram of a third structure of a display device according to an embodiment of the present disclosure.
Figure 4:
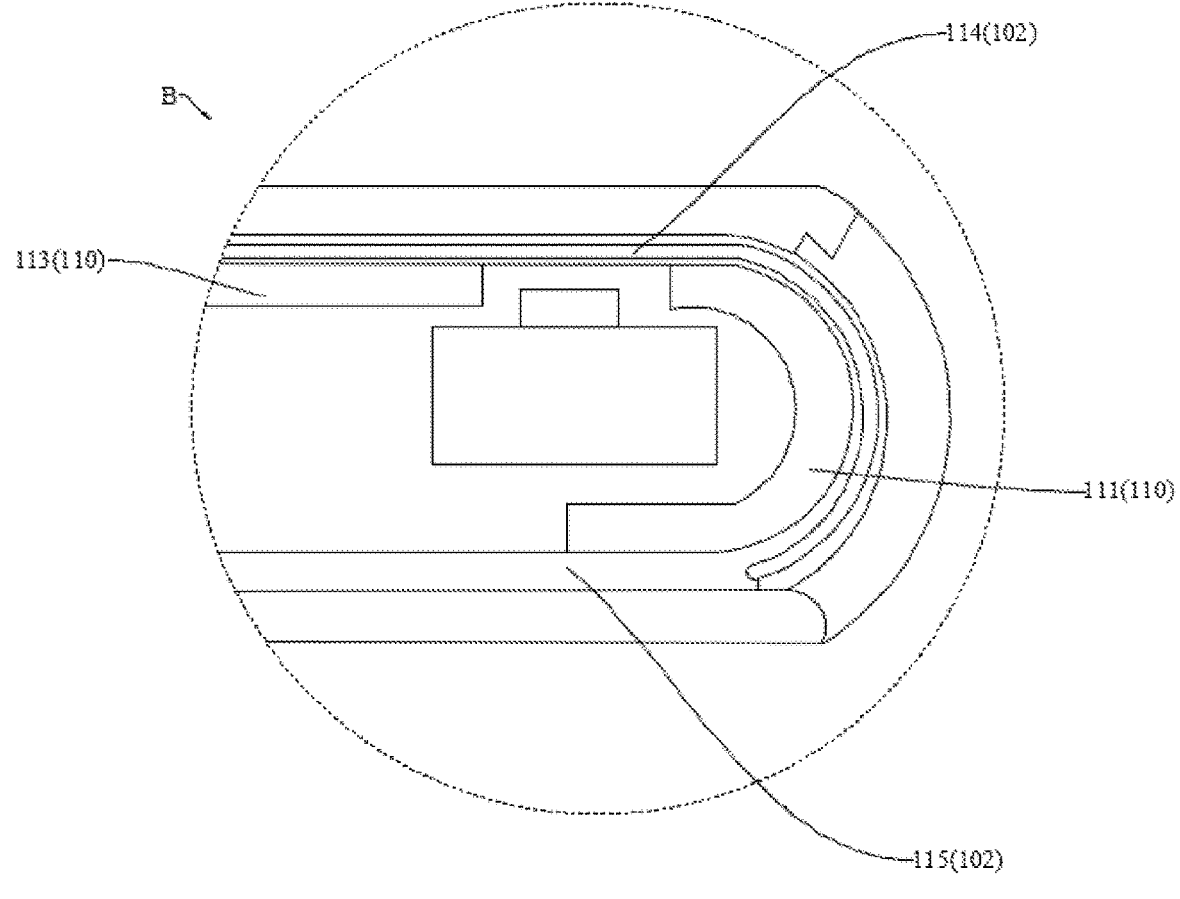
FIG. 4 is an enlarged view of a region B in the display device of FIG. 3.
Figure 5:
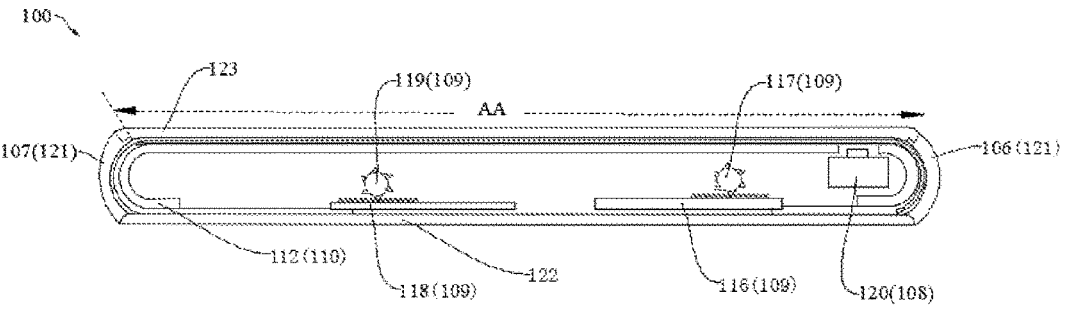
FIG. 5 is a schematic diagram of a fourth structure of a display device according to an embodiment of the present disclosure.

Referring to FIG. 2, when the display device 100 is in the second state, the optical assembly 108 of the display device 100 is in an operating state, for example, a front camera is in an on state. The light-transmitting area 103 is located within the display window AA and faces the optical assembly 108 so that an optical functional element 120 included in the optical assembly 108 receives an external light signal and performs its function. When the display device 100 is in the second state, at least a portion of the first display area 104 is located within the display window AA and at least a portion of the second display area 105 is located outside the display window AA. In this case, when images are to be displayed by the display device 100, the flexible screen 102 in both the first display area 104 and the second display area 105 in the display window AA serves to display images. Since the display device 100 still needs to perform image display in the second state, a pixel density of the flexible screen 102 in the first display area 104 may be less than or equal to that of the flexible screen 102 in the second display area 105. When the pixel density of the flexible screen 102 in the first display area 104 is equal to that of the flexible screen 102 in the second display area 105, it may facilitate the display device 100 to still maintain high-quality images in the second state. In addition, the pixel density of the flexible screen 102 in the first display area 104 may be less than that of the flexible screen 102 in the second display area

105, because users generally pay more attention to the operation of the optical assembly 108 in the second state of the display device 100, for example, the range of images captured by the front camera is as desired or not, and may not pay attention to the quality of images themselves displayed by the flexible screen 102 as much as that in the first state of the display device 100. By this configuration, the manufacturing cost of the display device 100 may be reduced.

A transmittance of the flexible screen 102 in the light-transmitting area 103 is greater than that of the flexible screen 102 in other regions (e.g., in the first display area 104 or the second display area 105), so as to facilitate the optical functional element 120 of the optical assembly 108 to receive the external light signal. Specifically, at least one through-hole passing through the flexible screen 102 is formed in the flexible screen 102 in the light-transmitting area 103. In the first state, the at least one through-hole is located outside the display window AA. In the second state, the at least one through-hole is in the display window AA and faces the optical assembly 108. The light-transmitting area 103 is not involved in the image display of the display device 100 in both the first state and the second state. The number of the at least one through hole may be one, two, or more. The at least one through hole may respectively be a special-shaped hole, such as a water droplet shape or a rectangle shape hole. Alternatively, a pixel density of the flexible screen 102 in the light-transmitting area 103 is less than that of the flexible screen 102 in the second display area 105 and/or that of the flexible screen 102 in the first display area 104. In this case, in the first state, the light-transmitting area 103 is located outside the display window AA, and the light-transmitting area 103 is not involved in the image display; in the second state, the light-transmitting area 103 is located within the display window AA, and the light-transmitting area 103 is involved in the image display, so that the display device 100 can also perform full-screen display in the second state.

Referring to FIGS. 3-7, in some embodiments, the display device 100 further includes a support assembly 110 disposed on the shell 101. The support assembly 110 is on a side of the flexible screen 102 away from the display window AA. The support assembly 110 includes a first support member disposed on the shell 101 proximate the first end 106 of the shell 101, and a second support member 112 proximate the second end 107 of the shell 101. A first end of the flexible screen 102 is curved around the first support member 111, or the first end and a second end of the flexible screen are curved around the first support member and the second support member, respectively, so as to enable the flexible screen 102 to slide close to the flexible screen 102 along surfaces of the first support member 111 and the second support member 112. Specifically, the first end of the flexible screen 102 is curved around the first support member 111, so that the flexible screen 102 can slide close to the flexible screen 102 along the surfaces of the first support member 111 and the second support member 112. Alternatively, the first end of the flexible screen 102 and the second end of the flexible screen 102 are curved around the first support member 111 and the second support member 112, respectively, so that the flexible screen 102 can slide close to the flexible screen 102 along the surfaces of the first support member 111 and the second support member 112.

When both ends of the flexible screen 102 are curved around the first support member 111 and the second support member 112, respectively, the first end of the flexible screen 102 is curved around the first support member 111 to a side of the first support member 111 away from the display window AA, and the second end of the flexible screen 102 is curved around the second support member 112 to a side of the second support member 112 away from the display window AA. The first display area 104 and the light-transmitting area 103 are near the first end of the flexible screen 102, and the second display area 105 is near the second end of the flexible screen 102. When the display device 100 is switched from the first state to the second state, the second end of the flexible screen 102 moves relative to the shell 101 in a direction toward the first end of the flexible screen 102, and the first end of the flexible screen 102 moves relative to the shell 101 in a direction away from the second end of the flexible screen 102, so that at least part of the second display area 105 slides out of the display window AA, and the light-transmitting area 103 and at least part of the first display area 104 slide into the display window AA, until the light-transmitting area 103 faces the optical assembly 108. When the display device 100 is switched from the second state to the first state, a movement direction of the second end or the first end of the flexible screen 102 is opposite to that of the flexible screen 102 when the display device 100 is switched from the first state to the second state.

When the display device 100 is switched from the first state to the second state or from the second state to the first state, an end of the second display area 105 close to the second end of the flexible screen 102 moves by a first distance, an end of the first display area 104 close to the first end of the flexible screen 102 moves by a second distance, and the first distance is equal to the second distance, so as to avoid wrinkles or damage of the flexible screen 102 caused by inconsistent movement distances of the first and second ends of the flexible screen 102 during sliding.

Referring to FIGS. 3-7, in some embodiments, the flexible screen 102 includes a flexible screen body 114 and a flexible screen support element 115. A first end of the flexible screen support element 115 is curved around the first support member 111 to a side of the first support member 111 away from the display window AA. Alternatively, the first end of the flexible screen support element 115 is curved around the first support member 111 to a side of the first support member 111 away from the display window AA, meanwhile a second end of the flexible screen support element is curved around the second support member to a side of the second support member away from the display window. The movement assembly 109 is connected to at least the first end of the flexible screen support element 115. Specifically, the only case is that the first end of the flexible screen support element 115 is curved around the first support member 111 to the side of the first support member 111 away from the display window AA, and the movement assembly 109 is connected to only the first end of the flexible screen support element 115. Alternatively, the first end of the flexible screen support element 115 is curved around the first support member 111 to the side of the first support member 111 away from the display window AA, the second end of the flexible screen support element 115 is curved around the second support member 112 to a side of the second support member 112 away from the display window AA, and the movement assembly 109 is connected to the first and second ends of the flexible screen support element 115.

The flexible screen support element 115 is disposed on a side of the flexible screen body 114 away from the display window AA. That is, the flexible screen support element 115 is on a side without display of the flexible screen body 114. The flexible screen support element 115 may be made from one or more selected from stainless steel, copper alloy, aluminum alloy, carbon fiberboard, or other materials for supporting.

A length of the flexible screen body 114 is less than a length of the flexible screen support element 115 in a direction from the first end of the shell 101 to the second end of the shell 101. Further, the flexible screen body 114 includes a first end close to the first support member 111 and a second end close to the second support member 112. The first end of the flexible screen body 114 may not be curved around the first support member 111 to the side of the first support member 111 away from the display window AA, and the second end of the flexible screen body 114 may not curved around the second support member 112 to the side of the second support member 112 away from the display window AA, so as to prevent the flexible screen body 114 from damage due to friction with a shell base of the shell 101 during sliding of the flexible screen 102 relative to the display window. That is, only the flexible screen support element 115 is curved around the support assembly to a side of the support assembly 110 away from the display window AA.

The first end of the flexible screen support element 115, which is curved around the first support member 111 to the side of the first support member 111 away from the display window AA, is connected to the movement assembly 109. Alternatively, the second end of the flexible screen support element 115, which is curved around the second support member 112 to the side of the second support member 112 away from the display window AA, is connected to the movement assembly 109. The movement assembly 109 provides a driving force to at least one of the first and second ends of the flexible screen support element 115 to slide the flexible screen 102 relative to the display window AA.

The flexible screen body 114 includes a substrate, a thin film transistor layer on the substrate, and a light-emitting device layer on the thin film transistor layer. The light-emitting device layer includes an anode layer, a light-emitting material layer on the anode layer, and a cathode layer on the light-emitting material layer. The display panel further includes a pixel definition layer disposed on the same layer as the light-emitting material layer, and a polarizing layer on the light-emitting device layer.

The flexible screen 102 further includes a flexible circuit board electrically connected to the flexible screen body 114, and an integrated circuit.

Referring to FIGS. 3-7, in some embodiments, the movement assembly 109 includes a first connection portion 116 fixed to at least the first end of the flexible screen support element 115 and a first drive portion 117 connected to the first connection portion 116. The first drive portion 117 forces the first connection portion 116 to move relative to the shell 101, so as to slide the flexible screen 102 relative to the display window. In some embodiments, the movement assembly 109 further includes a second connection portions 118. The first connection portions 116 is fixedly connected to only the first end of the flexible screen support element 115, and the second connection portion 118 is fixedly connected to only the second end of the flexible screen support element 115. The movement assembly 109 further includes a second drive portion 119, which is connected to the second connection portion 118 to drive the second connection portion 118 to move relative to the shell.

The first drive portion 117 forces the first connection portion 116 to move relative to the shell 101, so as to slide the flexible screen 102 relative to the display window AA. The first connection portion 116 includes a first connection plate. The first connection portion 116 can be fixedly connected to the flexible screen support element 115 by the first connection plate via screw fixing or adhesive fixing, preferably screw fixing, thereby achieving convenient manufacturing process and better fixing effect.

In some embodiments, the first drive portion 117 and the first connection portion 116 drive the flexible screen 102 to slide relative to the display window AA by means of a gear and rack transmission. The first drive portion 117 includes a first gear, the first connection portion 116 includes a first rack, and the first gear meshes with the first rack. The first gear rotates to drive the first rack to move, so as to move the first connection portion 116 relative to the shell 101 and slide the flexible screen 102 relative to the display window AA. The first gear includes a first shaft fixed to the shell 101 and a first rotatable wheel rotatably connected to the first shaft. A periphery of the first rotatable wheel is engaged with the first rack. The first rotatable wheel rotates relative to the first shaft to move the first rack relative to the shell 101, so that the first connection portion 116 moves relative to the shell 101. The first rack may be directly fixed to at least one of the first and second ends of the flexible screen support element 115. Alternatively, the first connection plate is fixed to at least one of the first and second ends of the flexible screen support element 115, and the first rack is fixed to the first connection plate. The first drive portion 117 further includes a first blocking member. The first blocking member is configured to prevent further rotation of the first gear, when the first gear rotates by a first target angle and the first rack moves by a first distance, thereby controlling the sliding distance of the flexible screen 102 relative to the display window AA, and realizing switching of the display device 100 at least between the first state and the second state.

In some embodiments, the first drive portion 117 and the first connection portion 116 drive the flexible screen 102 to slide relative to the display window AA by means of a chain transmission. The first connection portion 116 includes a first drive chain, and the first drive portion 117 includes a first main drive wheel and a first auxiliary drive wheel. The first drive chain is engaged with the first main drive wheel and the first auxiliary drive wheel. At least the first main drive wheel rotates to move the first drive chain, so as to move the first connection portion 116 relative to the shell 101 and slide the flexible screen 102 relative to the display window AA. The first main drive wheel includes a second shaft fixed to the shell 101 and a second rotatable wheel rotatably connected to the second shaft. The periphery of the second rotatable wheel is engaged with the first drive chain. The first auxiliary drive wheel includes a third shaft fixed to the shell 101 and a third rotatable wheel rotatably connected to the third shaft. The periphery of the third rotatable wheel is engaged with the first drive chain. The second rotatable wheel rotates relative to the second shaft, and the third rotatable wheel rotates relative to the third shaft to move the first drive chain relative to the shell 101, so as to move the first connection portion 116 relative to the shell 101. The first drive chain may be directly fixed to at least one of the first and second ends of the flexible screen support element 115. Alternatively, the first connection plate is fixed to at least one of the first and second ends of the flexible screen support element 115, and the first drive chain is fixed to the first connection plate. When the first main drive wheel rotates a second target angle, and the first drive chain moves a second distance, the first blocking member of the first drive portion 117 serves to prevent further rotation of the first main drive wheel to control the sliding distance of the flexible screen

102 relative to the display window AA, thereby realizing switching of the display device 100 between at least the first state and the second state.

In some embodiments, the first drive portion 117 and the first connection portion 116 drive the flexible screen 102 to slide relative to the display window AA by means of a screw transmission. The first connection portion 116 includes a first drive nut, the first drive portion 117 includes a first drive screw, and the first drive nut is engaged with the first drive screw. The first drive screw rotates to move the first drive nut, so as to move the first connection portion 116 relative to the shell 101, thereby sliding the flexible screen 102 relative to the display window AA. The first drive portion 117 further includes a first fixing portion. The first fixing portion is fixed to the shell 101 and rotatably connected to the first drive screw, and the first drive screw rotates relative to the first fixing portion to move the first drive nut relative to the shell 101, so as to move the first connection portion 116 relative to the shell 101. The first drive screw has a first end close to the first end of the flexible screen 102, and a second end close to the second end of the flexible screen 102, and the first fixing portion may be rotatably connected to both the first and second ends of the first drive screw. The first drive nut may be directly fixed to at least one of the first and second ends of the flexible screen support element 115. Alternatively, the first connection plate may be fixed to at least one of the first and second ends of the flexible screen support element 115, and the first drive nut is fixed to the first connection plate. When the first drive screw rotates a third target angle, and the first drive nut moves a third distance, the first blocking member of the first drive portion 117 serves to prevent further rotation of the first drive screw to control the sliding distance of the flexible screen 102 relative to the display window AA, thereby achieving switching of the display device 100 between at least the first state and the second state.

In some embodiments, the movement assembly 109 drives the flexible screen 102 to slide relative to the display window AA by means of a linear motor drive. The first connection portion 116 includes a first mover. The first drive portion 117 includes a first stator and a first linear motor, and the first stator and the first linear motor are fixed to the shell 101. The first linear motor drives the first mover to move linearly relative to the first stator so that the first connection portion 116 moves relative to the shell 101. The first mover may be directly fixed to at least one of the first and second ends of the flexible screen support element 115. Alternatively, the first connection plate is fixed to at least one of the first and second ends of the flexible screen support element 115, and the first mover is fixed to the first connection plate. When the first mover moves a fourth distance, the first blocking member of the first drive portion 117 serves to prevent further movement of the first mover to control the sliding distance of the flexible screen 102 relative to the display window AA, thereby achieving switching of the display device 100 between at least the first state and the second state.

Referring to FIGS. 3-4 and 6-7, in some embodiments, the same first connection portion 116 is fixedly connected to the first end of the flexible screen support element 115 and the second end of the flexible screen support element 115. That is, the first connection portion 116 is fixed to a side of the flexible screen support element 115 close to the first end 106 and to a side of the flexible screen support element 115 close to the second end 107. In this case, an end of the first connection portion 116 close to the first end 106 is fixed to the first end of the flexible screen support element 115 close to the first end 106, and an end of the first connection portion 116 close to the second end 107 is fixed to the second end of the flexible screen support element 115 close to the second end 107. This facilitates consistent sliding distance of the first end and the second end of the flexible screen 102 when the flexible screen 102 slides relative to the display window AA, thereby avoiding problems such as wrinkles or damage of the flexible screen 102 caused by inconsistency of movement distances of the first end and the second end of the flexible screen 102 during sliding.

Referring to FIGS. 3-7, in some embodiments, the first support member 111 includes a first curved surface protruding toward the first end 106. In the first state, the flexible screen 102 in the light-transmitting area 103 is attached to the first curved surface. In this case, a side of the flexible screen body 114 close to the first end of the flexible screen 102 is attached to the first curved surface. The second support member 112 includes a second curved surface protruding toward the second end 107. In the second state, at least a portion of the flexible screen 102 in the second display area 105 is attached to the second curved surface. In this case, a side of the flexible screen body 114 close to the second end of the flexible screen 102 is attached to the second curved surface. The first curved surface and the second curved surface are configured to provide a supporting force for the flexible screen 102 in sliding relative to the display window AA at the first end 106 and the second end 107 of the shell 101, respectively. This configuration further reduces the frictional resistance of the display screen during sliding, thereby reducing the risk of damage of the display screen.

In the direction from the first end 106 to the second end 107, a distance between the end of the first display area 104 near the first end of the flexible screen 102 and an end of the first display area 104 far from the first end of the flexible screen 102 is 3 mm to 10 mm, so that not only the light-transmitting area 103 can be completely located outside the display window AA in the first state, but also it can avoid increase in the manufacturing cost due to too large area of the first display area 104.

Referring to FIGS. 3-7, in some embodiments, the support assembly 110 further includes a third support member 113 disposed integrated with the first support member 111 and the second support member 112. The third support member 113 is disposed within the shell 101 and between the flexible screen 102 and the optical assembly 108.

An opening is formed in a side of the third support member close to the first end 106. The optical assembly 108 includes the optical functional element 120, which is fixed within the opening.

When the display device 100 is in the second state, a distance between an orthographic projection of a geometrical center of the optical functional element 120 on the flexible screen 102 and the end of the flexible screen 102 in the second display area 105 adjacent to the first end 106 is 1 mm to 5 mm, preferably 3 mm to 5 mm, so as to facilitate the optical functional element 120 to receive the external optical signal without affecting the arrangement of other structures in the shell 101. When the display device 100 is in the first state, the light-transmitting area 103 faces the optical assembly 108, i.e., the light-transmitting area 103 faces the optical functional element 120. Preferably, the orthographic projection of the geometric center of the light-transmitting area 103 coincides with the orthographic projection of the geometric center of the optical functional element 120 on the flexible screen 102. Therefore, a distance between the geometric center of the light-transmitting area 103 and the end of the second display area 105 close to the first display area 104 is 1 mm to 5 mm, preferably 3 mm to 5 mm, so that it may be ensured that the optical functional element 120 receives enough light signals, while avoiding too large area of the first display area 104 and increase in the manufacturing cost due to too far distance between the light-transmitting area 103 and the second display area 105.

Referring to FIGS. 3-7, in some embodiments, the shell 101 includes a shell base 122 and a first side wall 121. The shell base 122 and the first side wall 121 together form an accommodating cavity and the display window AA located on a side of the accommodating cavity away from the shell base 122.

A plane in which the display window AA is located is parallel to a plane in which the shell base 122 is located. The flexible screen 102, the optical assembly 108, the movement assembly 109, and the support assembly 110 are disposed in the accommodating cavity. The support assembly 110 may be integrated with the first side wall 121. Alternatively, the support assembly 110 may be fixed to the first side wall 121. In case that the support assembly 110 is to be fixed to the first side wall 121, a fixing means, such as adhesive fixing or screw fixing, can be used to fix the support assembly 110 to the first side wall 121. The first and second ends of the flexible screen 102 are parallel to the shell base 122. When the first and second ends of the flexible screen 102 slide relative to the display window AA, the movement direction of the first and second ends of the flexible screen 102 is parallel to the plane in which the shell base 122 is located. That is, the movement direction of the first connection portion 116 is parallel to the plane in which the shell base 122 is located. Preferably, a direction of a first driving force to the first connecting part 116 from the first drive portion 117 is perpendicular to a first plane, wherein the first plane is perpendicular to the plane in which the shell base 122 is located, and parallel to a plane in which the first end of the flexible screen 102 is located or a plane in which the second end of the flexible screen 102 is located. In this case, the direction of the first driving force or a second driving force (if present) is perpendicular to the first end or the second end of the flexible screen 102, so that the driving efficiency of the first driving force or the second driving force is maximized.

A side of the first side wall 121 corresponding to the first end 106 of the shell 101 includes a third curved portion having the same protruding direction as the first curved surface, and a side of the first side wall 121 corresponding to the second end 107 of the shell 101 includes a fourth curved portion having the same protruding direction as the second curved surface, so as to improve the space utilization rate of the accommodating cavity.

The display device 100 further includes a cover 123 fixed to the first side wall 121 and covering the display window AA. The cover 123 is configured to protect the display screen from dust and water from entering the shell 101, thereby protecting various components in the shell 101.

The first side wall 121 includes a first slot close to the cover 123. An edge of the cover 123 close to the first side wall 121 is fixed to the first slot.

Figure 6:
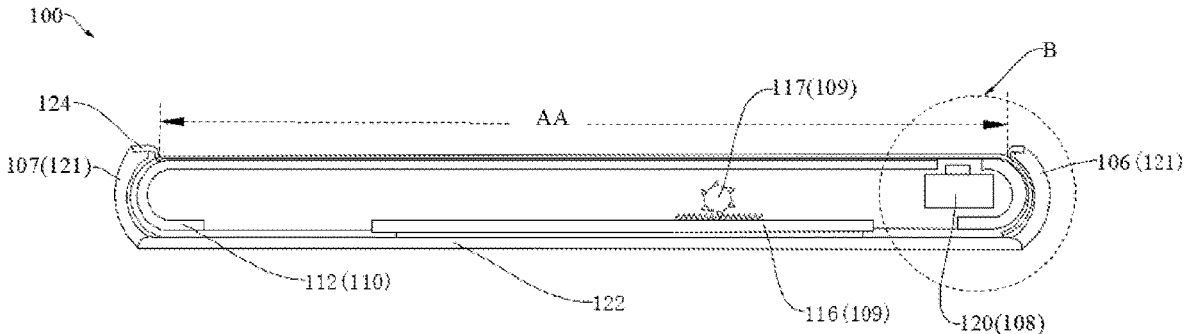
FIG. 6 is a schematic diagram of a fifth structure of a display device according to an embodiment of the present disclosure.
Figure 7:
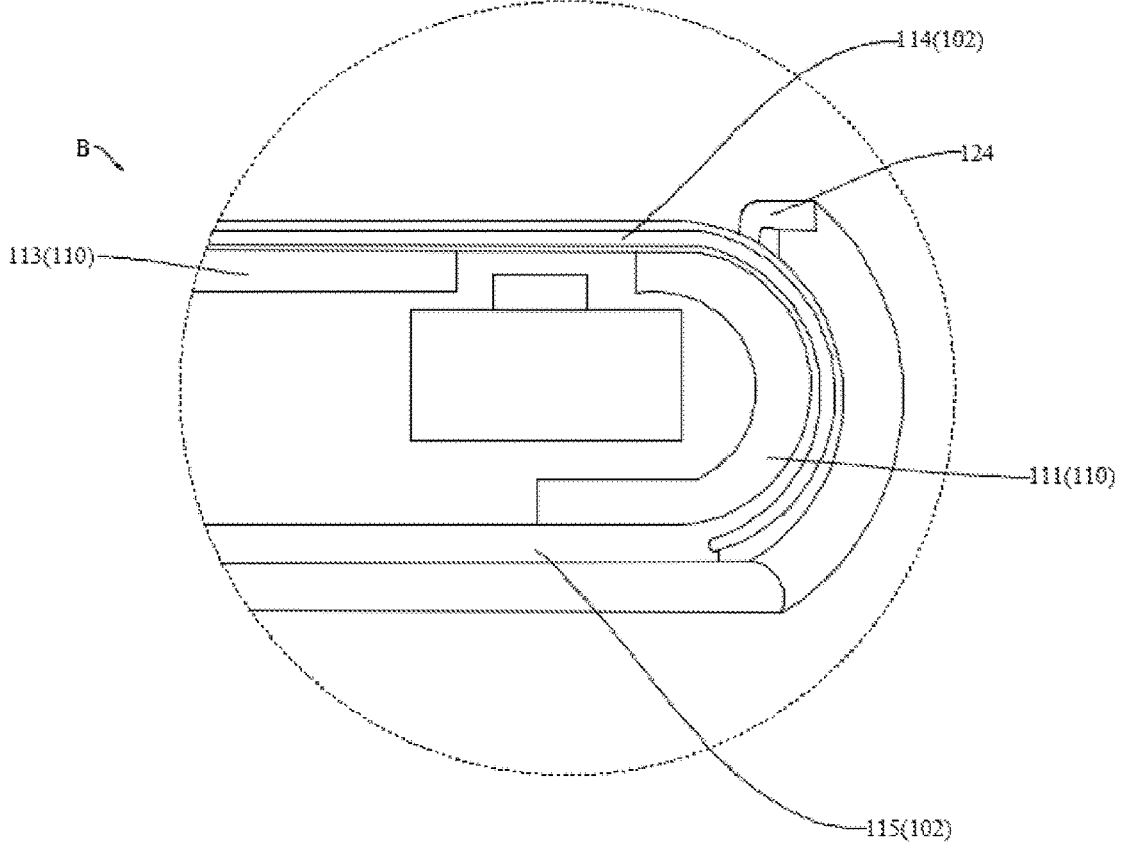
FIG. 7 is an enlarged view of a region B in the display device of FIG. 6.

Referring to FIGS. 6-7, in some embodiments, the shell 101 further includes a second side wall 124 fixed to an end of the first side wall 121 away from the shell base 122. The shell base 122 and the first side wall 121 together with the second side wall 124 form an accommodating cavity and the display window AA.

The first side wall 121 includes a second slot close to the second side wall 124. The second side wall 124 includes a fixing portion close to the first side wall 121, and the fixing portion is fixed in the second slot so that the second side wall 124 is fixed to the first side wall 121.

The second side wall 124 includes an extension portion extending toward the flexible screen 102. A distance between a display side of the flexible screen 102 and the extension portion is less than a distance between the display side of the flexible screen 102 and the first side wall 121. The second side wall 124 is configured to replace the cover 123 in order to reduce or even prevent dust and water from entering the shell 101, thereby protecting various components in the shell 101.

A gap may be present between the extension portion and the flexible screen 102 in a direction perpendicular to the display window. The distance between the display side of the flexible screen 102 and the extension portion in the direction perpendicular to the display window is 0.05 mm-0.3 mm, which neither causes the flexible screen 102 to be scratched by friction with the second side wall 124 during sliding due to too close of the extension portion to the display side of the flexible screen 102, nor results in damage to the display device 100 due to external dust, water, or the like entering the accommodating cavity through the gap between the extension portion and the flexible screen 102 caused by too far distance of the extension portion from the display side of the flexible screen 102.

The extension portion may be in contact with the display side of the flexible screen 102 to improve the protective performance against dust, water, or the like entering the interior of the display device 100. A buffer layer is disposed on a side of the extension portion close to the flexible screen 102 to avoid problems such as scratching of the display screen caused by contact between the display side of the flexible screen 102 and the extension portion, or abrasion due to movement of the display screen. The buffer layer may be made from a material having buffering performance, such as foam or rubber. Alternatively, the second side wall 124 may be made from a material having both buffering and supporting properties, such as rubber, in order to simplify the design of the second side wall 124 and improve the product yield of the display device 100.

The display device 100 may be of a flat display type or a foldable display type. When the display device 100 is of the foldable display type, the second side wall 124 is preferably selected to replaces the cover 123 in the display device 100, so as to improve the bending performance of the display device 100, avoid problems such as damage of the cover 123 in repeated folding, and improve the product quality of the display device 100.

In some embodiments, the display device 100 further includes a distance-controlling assembly that controls a sliding distance of the flexible screen 102 relative to the display window AA.

The distance-controlling assembly may be fixed to the shell 101, and specifically, the distance-controlling assembly may be fixed to the shell base 122, the first side wall 121, or the support assembly 110.

The distance-controlling assembly includes a locking member. When the flexible screen 102 slides to a target distance relative to the display window AA, and the switching of the display device 100 at least between the first state and the second state is completed, the locking member locks the flexible screen 102 or the first connection portion 116 so that the movement of the flexible screen 102 stops. At this time, the first drive portion 117 correspondingly stops driving the movement of the first connection portion 116. For example, the locking member may include a first elastic sheet disposed on the shell base 122. A first opening is formed on a side of the first connection portion 116 near the first end of the shell 101. When the flexible screen 102 slides to a target distance relative to the display window AA, the first elastic sheet is snapped into the first opening. Alternatively, the second connection portion 118 is further disposed, the locking member further includes a second elastic sheet. A second opening is disposed on a side of the second connection portion 118 close to the second end of the shell 101, and the second elastic sheet is snapped into the second opening, thereby stopping the flexible screen 102 from moving.

In some embodiments, the display device 100 further includes a distance sensing assembly disposed on the shell 101. The distance sensing assembly is configured to sense a sliding distance of the flexible screen 102 relative to the display window AA. Based on the movement distance sensed by the distance sensing assembly, the distance-controlling assembly may control the flexible screen 102 to keep sliding or stop sliding.

The distance sensing assembly includes a distance sensing receiving member fixed to the first connection portion 116, and a distance sensing transmitting member fixed to the first side wall 121 or the shell base 122. Alternatively, the distance sensing transmitting member is fixed to the first connection portion 116, and the distance sensing receiving member is fixed to the first side wall 121 or the shell base 122. The distance sensing assembly senses the movement distance of the first connection portion 116 by transmitting and receiving signal between the distance sensing transmitting member and the distance sensing receiving member, thereby sensing the movement distance of the first end or the second end of the flexible screen 102 relative to the shell 101. When the distance sensing assembly senses that the flexible screen 102 slides to the target distance, the distance-controlling assembly controls the flexible screen 102 to stop sliding according to the movement distance sensed by the distance sensing assembly. When the distance sensing assembly senses that the flexible screen 102 has not slid to the target distance, the distance-controlling assembly keeps the flexible screen 102 sliding based on the movement distance sensed by the distance sensing assembly.

According to embodiments of the present disclosure, the flexible screen 102 is slid relative to the display window AA by the movement assembly 109, so that the display device 100 is in the full-screen display state under the first state, and the light-transmitting area 103 is located outside the display window AA, thereby improving the display quality of the display device 100 in the full-screen display state.

An embodiment of the present disclosure discloses a display device including a shell forming a display window, the shell including a first end and a second end located on opposite sides of the display window; a flexible screen disposed on the shell, and including a light-transmitting area near the first end, a first display area surrounding the light-transmitting area, and a second display area on a side of the first display area far from the first end; an optical assembly disposed on the shell; a movement assembly connected to the flexible screen, the movement assembly being arranged on the shell and sliding the flexible screen relative to the display window. Therefore, in a first state, the second display area faces the display window, and the light-transmitting area is located outside the display window. In a second state, the light-transmitting area is in the display window and faces the optical assembly. According to the present disclosure, a flexible screen is slid relative to the display window by the movement assembly, so that the display device is in a full-screen display state under a first state, and the light-transmitting area is located outside the display window, thereby improving the display quality of the display device in the full-screen display state.

It is to be understood for those of ordinary skill in the art that equivalent substitutions or variations may be made in accordance with the technical solutions of the present disclosure and its inventive concept, and all such variations or substitutions are intended to fall within the scope of the claims appended to this application.

What is claimed is:

1. A display device, comprising:
   a shell formed with a display window, and comprising a first end and a second end disposed on opposite sides of the display window;
   a flexible screen disposed on the shell and comprising a light-transmitting area close to the first end of the shell, wherein the flexible screen comprises a flexible screen body and a flexible screen support element, and the flexible screen support element is on a side of the flexible screen body away from the display window;
   an optical assembly disposed on the shell and on a side of the flexible screen away from the display window;
   a movement assembly disposed on the shell and connected to the flexible screen; and
   a support assembly disposed on the shell and on the side of the flexible screen away from the display window,
   wherein the movement assembly is configured to slide the flexible screen relative to the display window so that the display device is switched at least between a first state and a second state;
   the support assembly comprises a first support member disposed in the shell and close to the first end of the shell, and a second support member disposed in the shell and close to the second end of the shell; at least a first end of the flexible screen is curved around the first support member, so as to enable the flexible screen to slide close to the flexible screen along surfaces of the first support member and the second support member, and
   at least a first end of the flexible screen support element is curved around the first support member to a side of the first support member away from the display window, and the movement assembly is connected to at least the first end of the flexible screen support element,
   wherein in the first state, the light-transmitting area is located outside the display window; and
   in the second state, the light-transmitting area is located within the display window and faces the optical assembly.

2. The display device according to claim 1, wherein the flexible screen further comprises a first display area surrounding the light-transmitting area, and a second display area on a side of the first display area away from the first end of the shell;
   in the first state, the second display area faces the display window; and
   in the second state, at least part of the first display area is located within the display window.

3. The display device according to claim 1, wherein the movement assembly comprises a first connection portion fixed to at least the first end of the flexible screen support element and a first drive portion connected to the first connection portion, and the first drive portion forces the first connection portion to move relative to the shell to slide the flexible screen relative to the display window.

4. The display device according to claim 3, wherein a second end of the flexible screen support element is curved around the second support member to a side of the second support member away from the display window, the movement assembly further comprises a second connection portion, the first connection portion is fixedly connected to the first end of the flexible screen support element, and the second connection portion is fixedly connected to the second end of the flexible screen support element; and
   the movement assembly further comprises a second drive portion, which is connected to the second connection portion to drive the second connection portion to move relative to the shell.

5. The display device according to claim 3, wherein the same first connection portion is fixedly connected to both the first end and the second end of the flexible screen support element.

6. The display device according to claim 1, wherein the first support member comprises a first curved surface protruding toward the first end of the shell, and in the first state, and the flexible screen in the light-transmitting area is attached to the first curved surface; and
   the second support member comprises a second curved surface protruding toward the second end of the shell, and in the second state, the flexible screen in at least part of the second display area is attached to the second curved surface.

7. The display device according to claim 1, wherein the support assembly further comprises a third support member integrated with the first support member and the second support member, the third support member being disposed in the shell and between the flexible screen and the optical assembly; and
   an opening is formed in a side of the third support member and close to the first end of the shell, the optical assembly comprises an optical functional element, and the optical functional element is fixed in the opening.

8. The display device according to claim 7, wherein, when the display device is in the second state, a distance between an orthographic projection of a geometric center of the optical functional element on the flexible screen and a side of the flexible screen in the second display area close to the first end of the shell is in a range of 1 mm to 5 mm.

9. The display device according to claim 6, wherein the shell comprises a shell base and a first side wall, the shell base and the first side wall form an accommodating cavity and the display window, and the display window is on a side of the accommodating cavity away from the shell base; and
   the display device further comprises a cover, which is fixed to the first side wall and covers the display window.

10. The display device according to claim 9, wherein a first slot is formed on a side of the first side wall close to the cover, and an edge of the cover close to the first side wall is fixed to the first slot.

11. The display device according to claim 1, wherein the shell further comprises a second side wall fixed to an end of the first side wall away from the shell base, the shell base and the first side wall together with the second side wall form an accommodating cavity and the display window; and
   the second side wall comprises an extension portion extending toward the flexible screen, and a distance between a display side of the flexible screen and the extension portion is less than a distance between the display side of the flexible screen and the first side wall.

12. The display device according to claim 11, wherein a second slot is formed in an end of the first side wall close to the second side wall, the second side wall comprises a fixing portion close to the end of the the first side wall, and the fixing portion is fixed in the second slot, so that the second side wall is fixed to the first side wall.

13. The display device according to claim 11, wherein a gap between the display side of the flexible screen and the extension portion in a direction perpendicular to the display window is in a range of 0.05 mm-0.3 mm.

14. The display device according to claim 11, wherein the extension portion is in contact with the display side of the flexible screen, and comprises a buffer layer disposed on a side close to the flexible screen.

15. The display device according to claim 9, wherein a movement direction of the first connection portion is parallel to a plane in which the shell base is located.

16. The display device according to claim 9, wherein the first side wall corresponding to the first end of the shell comprises a third curved portion protruding a same direction as the first curved surface, and the first side wall corresponding to the second end of the shell comprises a fourth curved portion protruding a same direction as the second curved surface.

17. The display device according to claim 1, further comprising:

a distance-controlling assembly disposed on the shell, wherein the distance-controlling assembly is configured to control a sliding distance of the flexible screen relative to the display window.

18. The display device according to claim 17, further comprising:

a distance-sensing assembly disposed on the shell, wherein the distance-sensing assembly is configured to sense the sliding distance of the flexible screen relative to the display window, and the distance-controlling assembly is capable of controlling the flexible screen to keep sliding or stop sliding, based to the sliding distance of the flexible screen sensed by the distance-sensing assembly.

19. A display device, comprising:

a shell formed with a display window, and comprising a first end and a second end disposed on opposite sides of the display window;

a flexible screen disposed on the shell and comprising a light-transmitting area close to the first end of the shell;

an optical assembly disposed on the shell and on a side of the flexible screen away from the display window;

a support assembly disposed on the shell and on the side of the flexible screen away from the display window, and a movement assembly disposed on the shell and connected to the flexible screen;

wherein the movement assembly is configured to slide the flexible screen relative to the display window so that the display device is switched at least between a first state and a second state; and the support assembly comprises a first support member disposed in the shell and close to the first end of the shell, a second support member disposed in the shell and close to the second end of the shell, and a third support member integrated with the first support member and the second support member; at least a first end of the flexible screen is curved around the first support member, so as to enable the flexible screen to slide close to the flexible screen along surfaces of the first support member and the second support member, the third support member is disposed in the shell and between the flexible screen and the optical assembly, and an opening is formed in a side of the third support member and close to the first end of the shell, the optical assembly comprises an optical functional element, and the optical functional element is fixed in the opening, wherein in the first state, the light-transmitting area is located outside the display window; and in the second state, the light-transmitting area is located within the display window and faces the optical assembly.

20. A display device, comprising:

a shell formed with a display window, and comprising a first end and a second end disposed on opposite sides of the display window, wherein the shell further comprises a shell base, a first side wall, and a second side wall fixed to an end of the first side wall away from the shell base, the shell base and the first side wall together with the second side wall form an accommodating cavity and the display window;

a flexible screen disposed on the shell and comprising a light-transmitting area close to the first end of the shell;

an optical assembly disposed on the shell and on a side of the flexible screen away from the display window; and a movement assembly disposed on the shell and connected to the flexible screen;

wherein the movement assembly is configured to slide the flexible screen relative to the display window so that the display device is switched at least between a first state and a second state; and the second side wall comprises an extension portion extending toward the flexible screen, and a distance between a display side of the flexible screen and the extension portion is less than a distance between the display side of the flexible screen and the first side wall, wherein in the first state, the light-transmitting area is located outside the display window; and in the second state, the light-transmitting area is located within the display window and faces the optical assembly.

* * * * *